United States Patent
Kausik

(10) Patent No.: US 6,170,058 B1
(45) Date of Patent: Jan. 2, 2001

(54) METHOD AND APPARATUS FOR CRYPTOGRAPHICALLY CAMOUFLAGED CRYPTOGRAPHIC KEY STORAGE, CERTIFICATION AND USE

(75) Inventor: Balas Natarajan Kausik, Menlo Park, CA (US)

(73) Assignee: Arcot Systems, Inc., Santa Clara, CA (US)

( * ) Notice: Under 35 U.S.C. 154(b), the term of this patent shall be extended for 0 days.

(21) Appl. No.: 08/996,758

(22) Filed: Dec. 23, 1997

(51) Int. Cl.[7] ................................ H04K 1/00; H04L 9/00
(52) U.S. Cl. ............................ 713/193; 713/185; 705/71
(58) Field of Search ............................. 380/3, 4, 23, 24, 380/25, 277, 279, 281, 282, 284, 286; 705/71, 72; 713/156, 159, 172, 183, 193, 184, 185

(56) References Cited

U.S. PATENT DOCUMENTS

| | | | |
|---|---|---|---|
| 5,206,905 | * 4/1993 | Lee et al. | 380/4 |
| 5,604,801 | * 2/1997 | Dolan et al. | 380/21 |
| 5,745,574 | * 4/1998 | Muftic | 713/157 |
| 5,761,306 | * 6/1998 | Lewis | 380/282 |
| 5,818,936 | * 10/1998 | Mashayekhi | 380/25 |
| 5,894,519 | * 4/1999 | Clemot et al. | 380/23 |
| 6,002,768 | * 12/1999 | Albanese et al. | 713/175 |

FOREIGN PATENT DOCUMENTS

| 2747208 | * 10/1997 | (FR) | G06F/1/00 |
|---|---|---|---|
| 96 02933 | * 2/1996 | (WO) | H04L/9/32 |

OTHER PUBLICATIONS

Translation of FR 2747208.*

Bruce Schneier, "Applied Cryptology: Protocols, Algorithms, and Source Code in C", 1st edition John Wiley and Sons, N.Y. (1992) pp. 415–417 (section 17.3).*

* cited by examiner

Primary Examiner—Pinchus M. Laufer
(74) Attorney, Agent, or Firm—Joseph Yang; Skadden, Arps et al.

(57) ABSTRACT

A digital wallet stores an cryptographically camouflaged access-controlled datum, e.g., a private key encrypted under the user's PIN. Entry of the correct PIN will correctly decrypt the stored key. Entry of certain pseudo-valid PINs will also decrypt the stored key, but improperly so, resulting in a candidate key indistinguishable from the correct key. Such pseudo-valid PINs are spread thinly over the space of PINs, so that the user is unlikely to realize a pseudo-valid PIN via a typographical error in entering the correct PIN. In existing wallet technologies, which lack pseudo-valid PINs, only the correct PIN produces a decrypted key; thus, hackers can find the correct PIN by entering all possible PINs until a key is produced. The present invention's plurality of candidate keys prevent a hacker from knowing when he has found the correct key. In addition, hacker detection may be moved off-line into devices accepting messages signed with candidate keys, and/or the lockout threshold may be increased. Thus, the wallet can be forgiving of typographic or transposition errors, yet a hacker trying large numbers of PINs will eventually guess a pseudo-valid (but still incorrect) PIN and recover a candidate private key whose fraudulent use will be detected. The wallet may be used with associated key generation, certification, and verification technologies. Such technologies may include pseudo-public keys embedded in pseudo-public certificates, i.e., public keys that are not generally known and which are contained in certificates that are verifiable only by entities so authorized by the certifying authority.

95 Claims, 12 Drawing Sheets

PRIOR ART

Correct PIN 510

PRIOR ART

KNOWN PLAINTEXT ATTACK

METHOD AND APPARATUS FOR CRYPTOGRAPHICALLY CAMOUFLAGED CRYPTOGRAPHIC KEY STORAGE, CERTIFICATION AND USE

FIELD OF THE INVENTION

The invention relates generally to cryptographically securing an access-controlled datum and, more specifically, to secure cryptographic key storage and use.

BACKGROUND OF THE INVENTION

Cryptographic data security techniques secure data by encrypting the data with a key. The decrypted data can only be recovered using the key. The key is selected to be sufficiently long that a malicious intruder cannot guess the key by exhaustive trial and error, even with the use of substantially large amounts of computing resources. Therefore, the security of the data has been transferred to the security of the key. Often, it is desirable to store the key so that access to the key is controlled by a pass-phrase or PIN (Personal Identification Number) that is short enough for a human user to remember easily. This would conveniently enable the human user to use his PIN to recover the key, and then use the key to recover the encrypted data. Unfortunately, if the PIN is short enough for the human to remember, it is also short enough for a malicious intruder to guess by exhaustive trial and error, thereby undermining the security of the key, and hence the security of the encrypted data. This has long been a vexing problem in data security. In the present invention, we will offer a solution to this problem, using a fundamentally new technique called cryptographic camouflaging. In contrast with conventional methods that aim to conceal the key, this new technique will camouflage the key by embedding it in a multitude of apparently similar keys. The keys are sufficiently different that the legitimate owner of the data can locate the correct key without any difficulty, using a short PIN that he can remember. Yet, the keys are sufficiently alike that a malicious intruder will find all of them equally plausible. The only way the intruder can select the correct key via trial and error, is to verify his trials with either the owner of the key, or with an administrative authority, thereby exposing himself. While the discussion that we will present is in the exemplary context of storing private keys for digital signatures, those skilled in the art will readily recognize that the technique of cryptographic camouflage can be used to secure other forms of data.

We now return to our discussion of the background of the invention. In asymmetric cryptographic methods such as RSA, each user holds a matched pair of keys, a private key and a public key. The private key and the public key form a unique and matched pair in that messages (e.g., messages, data, code, and any other digitally representable information including other cryptographic keys or cryptographic representations of information) that are encrypted with the private key can only be decrypted with the public key and vice versa. This one-to-one correspondence between the private key and the public key can be used to create digital signatures for electronic messages and transactions. In order to sign an electronic message, a user can simply encrypt the message with his private key. He would then attach his public key to the encrypted message and send it to the recipient. Alternatively, the user would not attach his public key to the message, but the recipient could look up the user's public key in a directory of public keys. In either case, to verify the signature, the recipient would decrypt the message using the attached public key, and if the decryption is successful, the recipient is confident of the origin of the message.

As described above, the sender would have to encrypt the entire message with his private key to sign it, which is computationally expensive. To address this, it suffices to compute a short hash of fixed length, say 128 bits long, of the message and then encrypt the hash value. If the hash function is a good one, such as MD5, the chances of two distinct messages having the same hash value is extremely small. Therefore, digital signature methods typically compute hashes of messages, and encrypt only the hash value. The encrypted hash value and the public key of the sender are attached to the original message prior to transmission to the recipient. To verify the signature, the recipient would first compute the hash of the received message. If the computed hash value is the same as the decrypted form of the encrypted hash, the recipient is confident of the origin of the message.

In the foregoing, the strength of the signature verification process depends on the recipient's confidence that the public key attached to the message is indeed the public key of the purported owner. Anybody can generate a matched pair of keys can masquerade as the user, unless there exists a means to prevent such a masquerade. To this end, public keys are often certified by third-party notaries called certifying authorities or CAs for short. Examples of certifying authorities are commercial entities such as Verisign and Entrust. The CA binds a certifiee's public key with the certifiee's identity, and then signs the combined message with the CA's private key, to form the certifiee's public key certificate. Thus, a certificate holder would attach his public key certificate to the encrypted message prior to sending the message to the recipient. To check the sender's identity and the authenticity of his public key, the recipient verifies the CA's signature on the sender's public key certificate, using the CA's public key. Since there would only be a small number of widely trusted CAs, the CA's public key would be reliably and easily available to the recipient. Thus, public key signatures can be used for stranger-to-stranger authentication in that even if the recipient and the sender have no prior relationship, the recipient can verify the sender's signature as long as the recipient and the sender both trust a common CA.

The uniqueness and unforgeability of a user's signature depend very strongly on the ability of the user to keep his private key private. Anybody who has access to the private key of a user can masquerade as that user with complete anonymity. Hence, widespread use of digital signatures for electronic commerce and other applications will require technology for the secure storage of private keys. At present, it is widely believed that private keys are best stored by physically isolating them on hardware devices such as smart cards, Fortezza cards, PCMCIA cards and other compact hardware devices. Smart cards are credit-card sized cards that contain a microprocessor and some memory. The user's private key and public key certificate are written onto the memory. To use the card, the user would simply insert the card into an appropriate card reader connected to a host computer, and then enter his PIN to activate the card. If the correct PIN is entered, the on-card processor would release the private key for use on the host computer. If an incorrect PIN is entered, the processor would not release the user's private key. Some tamper-resistant smart cards are configured so that if incorrect PINs are entered on several consecutive activation attempts, the card locks up permanently. Some sophisticated smart cards (often called cryptocards)

can perform cryptographic operations, so that the private key need never leave the smart card. The bytes to be processed enter the smart card from the host computer, are processed, and are then transmitted back to the host computer. Unfortunately, even cryptocards must rely on the host computer for transmitting the bytes back and forth from the card reader and are therefore not perfectly secure. A malicious host computer could simply substitute one message for another prior to transmission, so that the user thinks he is signing one message, while in fact he is signing another. Therefore, even cryptocards cannot combat malicious host computers.

While the smart card solves the problem of securely storing private keys, it suffers from several significant drawbacks:

1) High Initial Cost: Smart cards require expensive additional hardware infrastructure in the form of smart card readers;
2) Administrative Overhead: Smart cards require administrative overhead for distribution and upkeep; and
3) Low User Convenience: The user cannot duplicate, backup or collate smart cards, owing to their tamper proof features.

A secure software-based key wallet that does not require additional hardware would mitigate some of the drawbacks of the smart card listed above. Unfortunately, there are no such solutions presently available. The standard technology that is used today for key storage, in products such as those of Microsoft and Netscape, offers very little protection against tampering, and can be broken into rather easily. Specifically, these key wallets store the private key in encrypted form, using the user's PIN as the encryption key. The PIN must be short enough for the user to remember, say a six-digit code. If such a software key wallet falls into the hands of a hacker, the hacker could exhaustively try all one million possible six-digit codes in an automated fashion on a personal computer within a few minutes, until he finds the code that opens the key wallet. At this point, the hacker knows that he has exactly the correct PIN, and has access to the user's private keys. Thus, the primary problem with providing a software-only key wallet are the competing requirements that the PIN be short enough for the user to remember, but long enough to make the key wallet tamper resistant.

SUMMARY OF THE INVENTION

Figure 1:
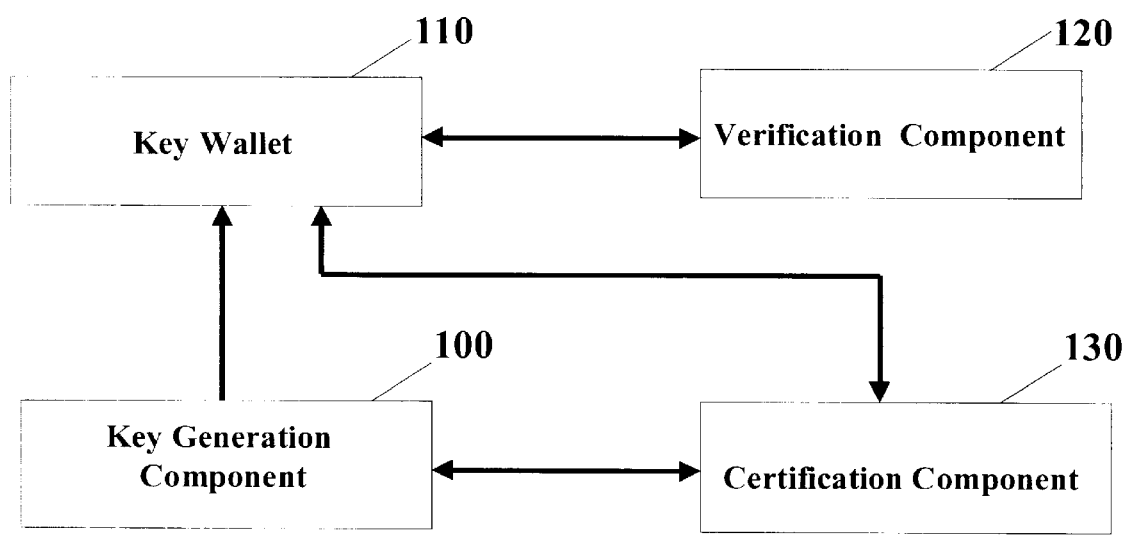
FIG. 1 is a schematic overview of a cryptographic key wallet and key generation, key certification, and verification subsystems.

The present invention offers a new technique for data storage called cryptographic camouflaging. In contrast with conventional cryptographic methods that aim to conceal the data, the present invention camouflages the data by embedding it amongst many pieces of similar data. The embedding is varied in that the pieces of data are sufficiently different that the legitimate owner of the data can locate the correct piece without any difficulty, using a short PIN that he can remember. Yet, the embedding is homogenous, in that the pieces of data are sufficiently alike that a malicious intruder will find all of them equally plausible. The only way the intruder can select the correct data via trial and error is to verify his trials with either the owner of the data, or with an administrative authority, thereby exposing himself.

Preferably, the multitude of data pieces selected for the embedding satisfy the competing constraints of being sufficiently varied for the convenience of the legitimate owner, and yet sufficiently homogenous to foil the malicious intruder. Those skilled in the art will realize that such an embedding may be tailored to the specific context of each particular application. In this specification, we discuss an exemplary application of storing private keys in a key wallet, compatible with existing public key signature methods such as RSA, DSS, El-Gamal, elliptic curve cryptosystems, and their associated key generation, verification and certification technologies. Those skilled in the art will also realize that the technique of cryptographic camouflaging can also be applied to other embodiments, by following the general methods of the exemplary embodiment. Therefore, the term key wallet (or, alternatively, digital wallet) should be understood generally to refer to any device for storing cryptographic camouflaged access-controlled datum rather than only the exemplary embodiment described herein.

A key wallet may be implemented as a software wallet, which the user would unlock, using a PIN, in much the same way as he would use a smart card. The advantages of a software-based wallet scheme include:

1) Low Cost: The system does not require additional hardware infrastructure. The wallet can be embodied in any digital storage medium including floppy disks, hard disks, magnetic stripe cards, and even smart cards themselves;
2) Low Administrative Overhead: The wallet can be distributed electronically and updated electronically as required;
3) High User Convenience: The user can duplicate, backup, and collate wallets. Wallets can also be transmitted electronically;
4) Tamper Resistance: The wallet can be tamper resistant in functionally the same sense as a smartcard; and
5) No Undue Burden on User: The user's experience with the wallet would be the same as that with the smart card, and the user would not require unusually long PINs, or require extreme care in entering PINs, etc.

Other associated aspects of the present invention relate to the creation and management of public-key certificates usable with the above key wallet. The advantages of such certificates include:

1) Limited liability: The public key is pseudo-public, and its use is limited explicitly to authorized verifiers who are authorized by the certifying authority. This could also, as a practical matter, limit the legal liability of the certifying authority.

2) Certificate Revocation: Public-key certificates may be created that are only useful to authorized verifiers; thus, revocation of the certificates is facilitated to the extent that only the authorized verifiers need to be notified of the cancellation of a certificate.

Of course, although there are many advantages to a software-only implementation of the present invention, parts or all of the system could even be implemented in a combination of hardware and software, or even purely in hardware, providing great flexibility for deployment and usage. We first describe a metaphor for the cryptographically camouflaged key wallet system, followed by a summary of a technological realization thereof.

Consider the problem of selecting a lock for the main door of a home. We could select a small, inexpensive lock with a key that is small enough to be carried conveniently. Or we could select a large, strong lock, with a big key that is difficult to carry around conveniently. A third alternative is a strong electronic lock with a key card, such as those used in hotels and other institutions. Such electronic locks are expensive and involve some administrative overhead, but they are both convenient and secure. Metaphorically speaking, the inexpensive locks represent the simple passwords that are widely used to protect computing resources; the strong locks with the big keys represent public key methods—they are powerful but cumbersome; the electronic key card locks represent public key authentication methods with smart cards for storing the keys. In this metaphor, the conventional software solution for private key storage is equivalent to hiding the key under the doormat. The user locates the key under the doormat using his PIN. Unfortunately, it is easy for the malicious hacker to exhaustively search under the doormat until he finds the key. In contrast, using the present invention, the user could hide 10,000 keys under the doormat. One of these keys is the correct key and will unlock the door. The remaining keys will either not work and/or set off alarms when used. The keys are carefully specified to be sufficiently different so that the legitimate user can find the correct key easily even in the dark. However, the keys are sufficiently alike that all of them look equally plausible to the intruder, and selection of one wrong key does not give useful feedback as to a next key to try.

The key wallet aspect of the present invention is a technological realization of the above metaphor of cryptographic camouflaging. In one embodiment thereof, the key wallet stores the private key in encrypted form, where the encryption key is the user's PIN. The user recovers his private key using his PIN, which is typically a six-digit code. If the user enters exactly the correct PIN, he will recover his private key correctly. If the user enters an incorrect PIN, one of two things will happen: (a) the key wallet will not open; or (b) the key wallet will open and an incorrect private key will be recovered. For example, of the 1,000,000 possible six-digit PIN codes, 10,000 of them will result in the key wallet opening and yielding a candidate private key. However, only one of these candidate private keys will be the correct private key. The others will be incorrect keys that will nevertheless look just as plausible as the correct private key. As with the metaphor above, the legitimate user will be able to locate the correct private key, since he knows the true PIN. The malicious hacker who exhaustively tries all possible PINs will recover all 10,000 candidate private keys, all of them equally plausible. The only way the hacker can find out which of these keys is the correct one is to use the keys at some enterprise authorized to accept them. This would, with high likelihood, expose the hacker as an intruder. In the foregoing, the user of the key wallet is a person accessing the private key contained therein. Alternatively, the user need not be a person, but could be an application program, a hardware device, or some agent of a person. However, as a matter of convenience, the term user shall be used herein in the exemplary context of a person accessing the key wallet.

The foregoing describes an exemplary implementation of cryptographic camouflaging, directed at secure storage of private keys using a PIN. Those skilled in the art will realize, however, that the present invention is usable generally for secure storage of any access-controlled datum (ACD) using any digitally representable access code. Therefore, the term key wallet (or, alternatively, digital wallet) should be understood generally to refer to any device for storing cryptographic camouflaged access-controlled datum rather than only the exemplary embodiment described herein. Finally, still other related aspects of the invention include key generation, verification and certification technologies, as will be explained in detail below.

Persons skilled in the art will recognize that applications of the present invention include, but are not limited to: (a) strong authentication for secure remote/local access to computing and storage resources; (b) reduced user sign-on in environments with multiple computers on a network; (c) strong authentication for secure access through firewalls with or without the IPSEC network protocol; (d) digital signatures for secure electronic commerce transactions; (e) digital signatures for electronic payment mechanisms; (f) secure access to databases and/or digital signatures for database transactions; (g) secure access to routers and network switches; (h) secure access to distributed services; and (i) embedded applications wherein the user (e.g., of the digital wallet) is represented by a computational agent, such as a program running in software or hardware, as applied to, but not limited to, any of the aforementioned applications.

DETAILED DESCRIPTION OF THE INVENTION

FIG. 1 gives a schematic overview of functional elements of the overall system, each of which plays a role in the secure storage of the private key and its subsequent use. The first component is the key generation component 100, which creates the public and private keys for the user. The second component is the key wallet 110, which stores the private key and is used to create signatures. The third component is the verification component 120, which is used to verify the signatures created by the key wallet. The fourth component is the certification component 130, which is used to certify the public key created by the key generation component. The key wallet component provides the embedding for the cryptographic camouflaging, while the other elements ensure that the embedding is sufficiently varied to be of convenience to the legitimate user, and yet appears sufficiently homogeneous to foil the malicious intruder. In an exemplary embodiment of the invention, the foregoing are implemented as software running on a general purpose computer.

1. Details of the Key Wallet

For the purpose of analysis, we consider the key wallet to be a software-based lockbox containing the user's private key. Assume also that the lockbox can only be unlocked by a secret PIN that is known only to the legitimate user. Suppose the key wallet falls into the hands of a malicious hacker. We enumerate the kinds of attacks the hacker can mount on the black box, and provide a means to resist each attack. In the interest of clarity, the discussion will be set forth with respect to the RSA public key signature system. However, those skilled in the art will appreciate that the basic elements of the discussion are applicable to other systems as well, including, without limitation, the El-Gamal and DSS signature systems, and elliptic curve cryptosystems.

a. PIN Hash Attack

Figure 2:
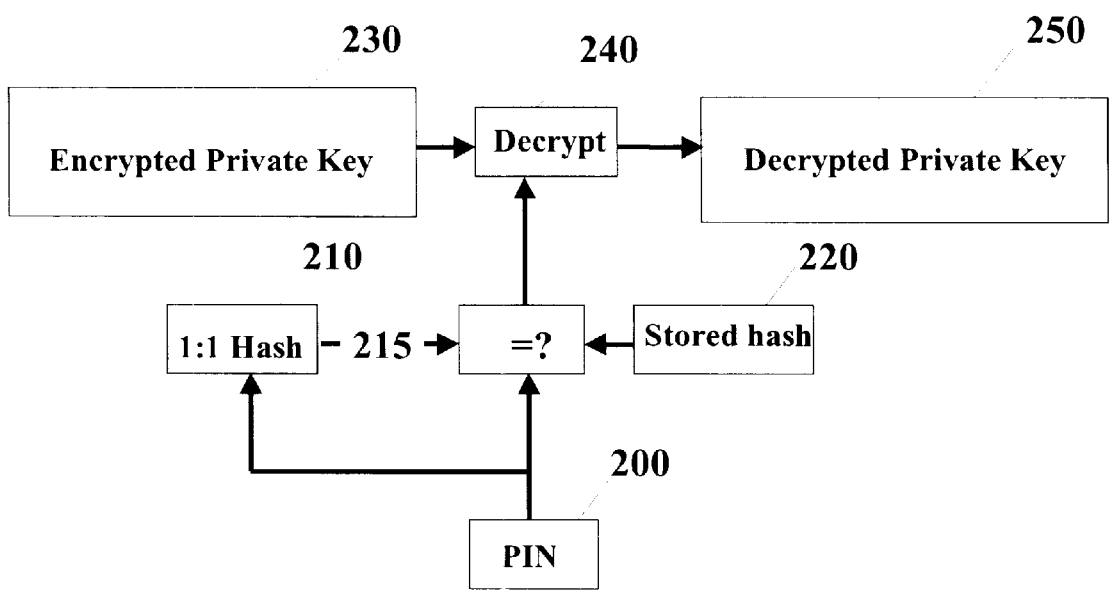
FIG. 2 illustrates a conventional key wallet.

A conventional key wallet is depicted schematically in FIG. 2. A PIN 200 (more generally, an access code) entered to unlock the wallet is passed through a one-to-one hash function 210. The hash function may also include a salt value or other security-enhancing feature, as will be appreciated by persons skilled in the art. The hashed value 215 of the entered PIN is compared with a stored hash value 220, which is the hashed value of the correct PIN. If the two hash values agree, the PIN is passed to decryption module 240. The private key which has been encrypted (with the correct PIN as the encryption key) and stored in field 230, is decrypted by decryption module 240, which is typically DES or some other cryptographic function such as, for example, triple-DES, IDEA or BLOWFISH. Hence, the decrypted private key 250 is released for use.

The cryptographic operations of computing the hash(es) and decrypting the stored hash may be implemented using one or more cryptographic logic (e.g., software) modules, and the correct hash value and private key may be stored in protected data fields or other forms of memory (e.g., read from ROM, from computer-readable media, etc.). A typical key wallet would also include input and output logic for receiving candidate PINs and outputting decrypted private keys, as well as logic for management, viewing, copying, and handling of keys and other data.

The one-to-one nature of the hash function ensures that the correct PIN and only the correct PIN will unlock the key wallet. Unfortunately, it also provides the malicious hacker complete information to automate the process of guessing the correct PIN. In a typical implementation, the PIN is a code of six or fewer digits. The hacker simply has to find the six-digit code that hashes to the stored hashed value. If he gets a copy of the key wallet, he can carry out this attack on his computer, completely undetected and in an automated fashion, in a matter of a few minutes. For example, he might write a program that simply checks all six-digit PIN codes on the key wallet.

To resist the PIN hash attack, the present invention replaces the one-to-one hash with a many-to-one hash, i.e., a hash in which many inputs produce (i.e., regenerate) the same hashed output. This is depicted in the flow chart of FIG. 3. In a typical implementation, the many-to-one hash finction 310 might hash six-digit codes to two-digit hash values. As in the conventional key wallet, the hashed value 315 of the entered PIN 300 is compared with the stored hash value 320, which is the hashed value of the correct PIN. If the two hash values agree, the key wallet opens. The private key is again stored encrypted in field 330 of the key wallet, with the correct PIN as the encryption key. When the correct PIN is entered, the stored encrypted key is decrypted and the correct private key 350 is released for use. However, since the hash function is many-to-one, there will be many different entered PINs that will open the key wallet. (PINs that hash to the same hash value as the correct PIN, including the correct PIN, are called pseudo-valid PINs.) For example, if the hash function hashes six-digit codes to two-digit hash values, there will be 10,000 six-digit pseudo-valid PINs that will open the key wallet, out of a total of 1,000,000 possible six-digit codes. Pseudo-valid PINs will all be passed to the decryption module 340 to decrypt the stored encrypted key to produce a candidate private key. However, all but one of these candidate private keys will be incorrect decryptions of the stored (correct) private key. Only when the entered PIN is the correct PIN will the correct private key be recovered.

Figure 4:
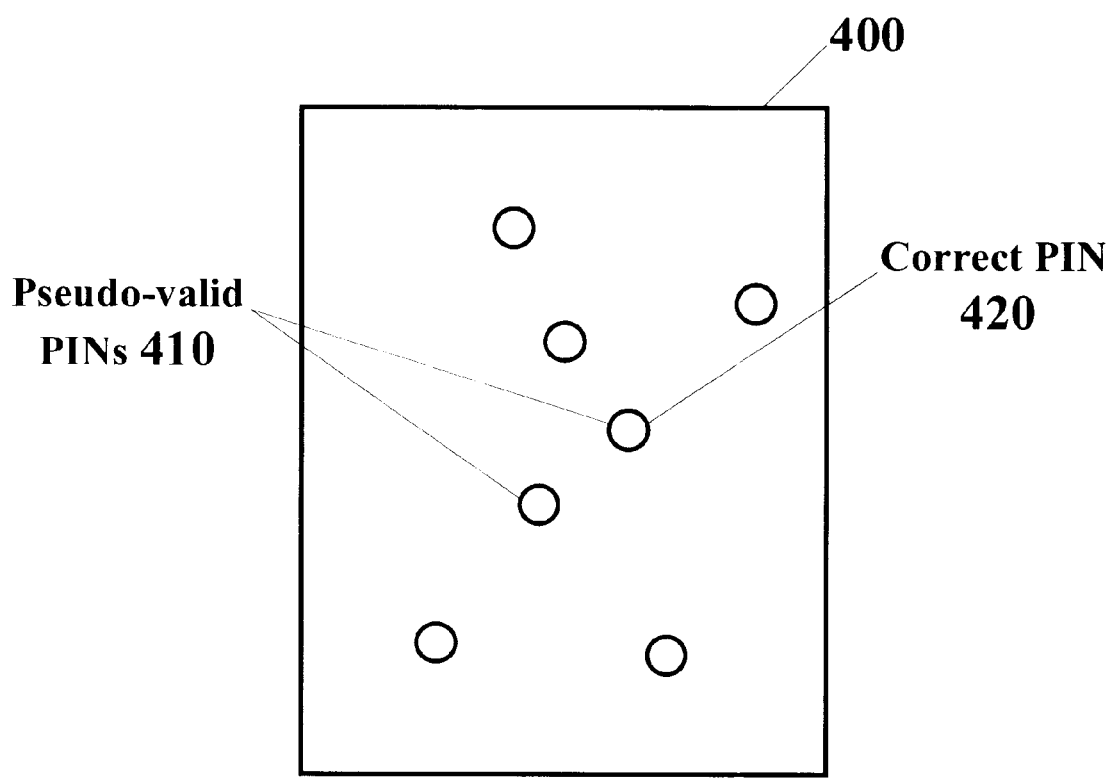
FIG. 4 illustrates a distribution of pseudo-valid PINs among the space of all possible PINs.
Figure 5:
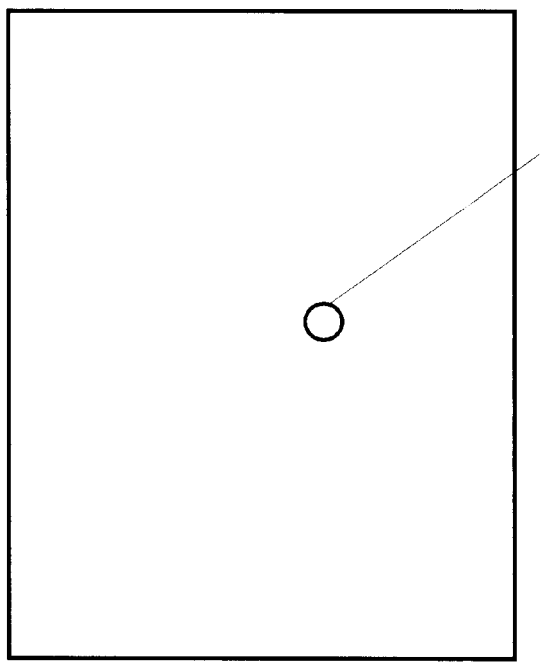
FIG. 5 illustrates a neighborhood surrounding a correct PIN.

Preferably, the many-to-one hash function above should be chosen to be a good hash. For example, and without limitation, MD5 and SHA are well-known good hash functions. Good hash functions are one means to substantially uniformly distribute the pseudo-valid PINs in the space of all possible PINs. For example, consider a hash function from six-digit codes to two-digit hash values. Of the 1,000, 000 possible input values, 10,000 will be pseudo-valid PINs. If the hash function is a good hash, these values will be substantially uniformly distributed. In particular, one in a hundred PINs will be pseudo-valid, and these will be effectively randomly distributed. Specifically, the chances are 1/100 that if the user makes a typographical error in entering the correct PIN, then the resulting PIN will be a pseudo-valid PIN. Pictorially, this is seen in FIG. 4, where the space of all possible PINs is shown as a wall 400. The holes 410 in the wall correspond to the pseudo-valid PINs. Only one of these holes 420 corresponds to the correct PIN, as shown in the figure. Notice that there is a neighborhood of PINs around each pseudo-valid PIN that will not hash to the stored hash value. Compare this with FIG. 5, which shows the space of PINs for a one-to-one hash as used in the conventional key wallet. Notice that FIG. 5 shows only one hole 510, corresponding to the correct PIN. Also notice that the local neighborhood of the correct PIN in FIG. 4 looks like the neighborhood of the correct PIN of FIG. 5. In this sense, the legitimate user's experience with the key wallet of the present invention is very similar to his experience with the conventional key wallet.

Another possible scenario involves using a weak hash, i.e., one which results in clustering of pseudo-valid PINs, whereby an intruder who guesses one pseudo-valid PIN will more easily find others. A legitimate user making a series of 1-digit typographical errors would also get a sequence of pseudo-valid PINs and, if the system accepting the private key or messages encrypted thereby has an alarm-or-disable-upon-repeated-failure feature, this would inadvertently lock out the legitimate user. Thus a weak hash is typically disfavored over the good hash. Nevertheless, there may be some applications where a weak hash provides certain characteristics such as computational efficiency and ease of implementation that are advantageous for specialized applications.

b. Known Signature Attack

Figure 6:
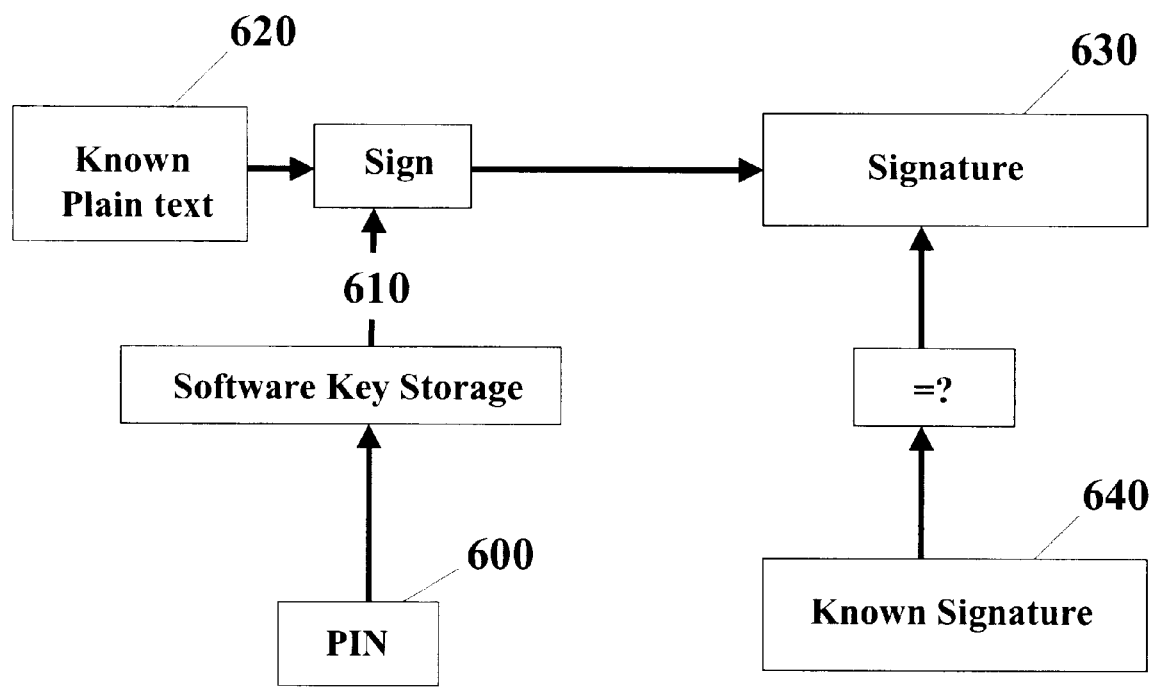
FIG. 6 illustrates a known-plaintext attack that is addressed by a signing aspect of the present invention.

Another common attack is the known signature attack. In this attack, sometimes called a known-plaintext attack, the malicious hacker has access to two pieces of information: (a) the user's key wallet; and (b) a message (in both plain text and signed form) that was previously signed by the user. This attack is shown pictorially in FIG. 6. The hacker will try all possible PINs 600 on the key wallet, and for each pseudo-valid PIN, use the decrypted private key 610 to sign the known plain text 620, creating a signature 630. If the signature 630 matches the known signature of the user 640 of the same plain text message, the hacker knows that he has discovered the correct PIN and has recovered the user's correctly decrypted private key. In the conventional signature process, the plain text message to be signed is hashed using a hashing algorithm (such as MD5), and the hashed plain text is encrypted using the user's private key to form the signature. Often, a pseudo-random pad is added to the plain text prior to hashing to resist chosen plaintext attack. Such pseudo-random bits are typically generated from a seed that is stored on the key wallet, or some other source that can be traced and replicated, such as the time of day, etc. A disadvantage of such pseudo-random bits is that an attacker who determines the randomness generation mechanism can obtain useful feedback for the known signature attack. Thus, an aspect of the present invention resists this attack via a variation on the signature process.

Figure 7:
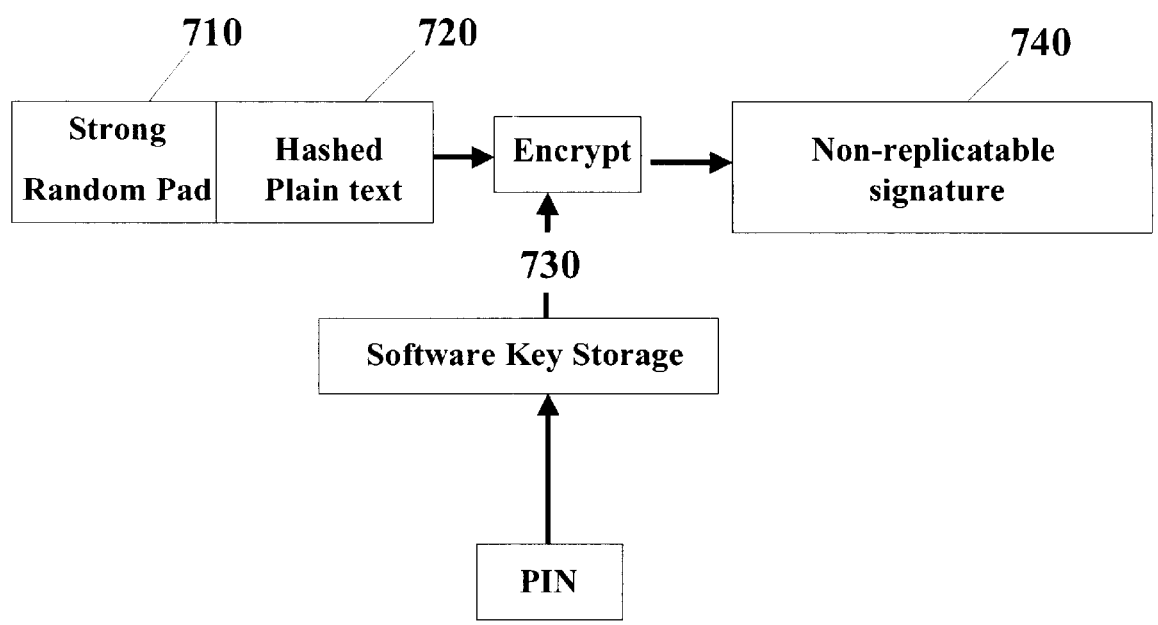
FIG. 7 illustrates an exemplary embodiment of a signing aspect of the present invention.

As shown in FIG. 7, the signing component of the present invention pads the hashed plain text 720 with strongly random bits 710, prior to encryption with the private key 730, to create a non-replicatable signature 740. Such strongly random bits may be generated using a method that relies on a source of randomness outside the key wallet. Examples of such are physical sources of randomness, such as the variation in the seek time of the disk drive on a host computer, the random time intervals between keystrokes on a keyboard, or random characters input by a user. These and other methods for generating strong randomness are well known to those skilled in the art (e.g., see D. Davis, R. Ihaka, and P. Fenstermacher, "Cryptographic Randomness from Air Turbulence in Disk Drives," *Advances in Cryptology: Proc. Crypto* 84, Springer-Verlag, 1985, pp. 183–215; or, more generally, Bruce Schneier, *Applied Cryptography,* 2nd Ed., Wiley, 1996). The purpose of such strong random pads is to ensure that signatures cannot be replicated by a malicious hacker, since he does not know the random pad, and cannot recreate the random pad from any information stored in the key wallet as might be the case with a pseudo-random pad. Still other applications of strong randomness to dissuade attacks are well known to those skilled in the art, and can be implemented in alternative embodiments of the present invention.

c. Ill-Formed Key Attack

Another attack is one in which the malicious hacker tries all possible PINs and, for each pseudo-valid PIN, examines the decrypted key. If the key is not well formed, the hacker knows that the pseudo-valid PIN cannot be the correct PIN. Therefore, it is necessary to ensure that candidate private keys, derived by decrypting the stored key with pseudo-valid PINs, are also well-formed.

Figure 8:
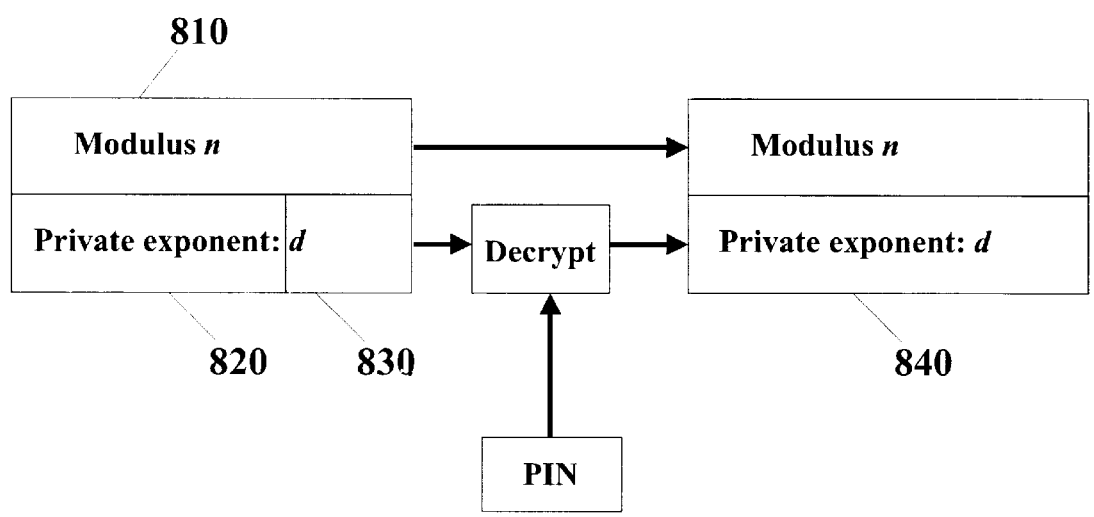
FIG. 8 illustrates an exemplary embodiment for generating well-formed private keys in a key generation aspect of the present invention.

In the RSA system, a private key has an exponent (d) and a modulus (n), and is said to be well-formed if the modulus does not have any small factors and the exponent d is smaller than (p-1)(q-1) and not divisible by p or q, where p and q are the prime factors of the modulus n. Therefore, the modulus and exponent of candidate private keys must also meet these conditions. One embodiment of the present invention that ensures both conditions is shown in FIG. 8. Assuming the correct private key was properly formed, the modulus 810 is stored unencrypted and is not modified by the encryption/decryption process. Therefore, the candidate private key's modulus is well formed by definition. The problem, then, is ensuring that the candidate private key's exponent (hereafter, the "candidate exponent") is well-formed. The likelihood of the candidate exponent sharing prime factors with the modulus is extremely small, and comparable with the likelihood of factoring the modulus serendipitously. Therefore, the primary constraint is on the size of the candidate exponent relative to the modulus. One way of ensuring this is as follows. Since the exponent of the correct private key (hereafter, the "correct exponent") was well-formed, candidate exponents that are similar in size to the correct exponent are likely to also be well-formed.

One method of ensuring this is to divide the correct exponent into its most significant portion 820 and least significant portion 830. For example, 65537 has "65" as its most significant 2 digits and "537" as its least significant 3 digits. The most significant bits are stored unencrypted, while only the least significant bits of the correct exponent are encrypted using the PIN and stored. When the stored least significant bits are decrypted using a pseudo-valid PIN, they will change completely (e.g., 537 might become 142 in the example above). The stored most significant portion and the decrypted form of the least significant portion are then assembled to recover the candidate exponent 840. However, the magnitude of the reassembled candidate exponent will not have changed significantly. By properly choosing the number of least significant bits, one can control the order of magnitude of the recomputed candidate exponent, to ensure that it remains smaller than the modulus. The foregoing illustrates the concept of least-significant-bit-encryption using base-10 arithmetic. The corresponding computer-based implementation would be similar, except using bits rather than digits. For example, if the modulus has 512 or more bits, an exemplary implementation might encrypt only the 128 least significant bits of the exponent using the PIN as the key.

Those skilled in the art will realize that there are many alternative ways of ensuring that candidate private keys are well-formed. In an alternative method, the key generation module selects two random numbers k and m, where m is a number between d and the modulus n. In an exemplary implementation, k could be of length 64 bits. The sum d+km is computed, k is discarded, and m is stored for later use. Rather than storing the correct exponent d, the sum d+km is then encrypted using the PIN, and stored as an encrypted sum. When a pseudo-valid PIN is entered, the encrypted sum is decrypted to obtain the decrypted sum, which is then evaluated modulo m. That is, a candidate exponent is recovered as the remainder after dividing the decrypted sum d+km by m. Such a candidate exponent is, by construction, smaller than m. Since m was selected to be smaller than the modulus n, the candidate exponent is therefore also guaranteed to be smaller than n.

The foregoing illustrates two exemplary embodiments for ensuring well-formedness of RSA-compatible candidate private keys. As those skilled in the art will appreciate, the concept of ensuring well-formedness also extends to other private keys and, more generally, to other types of stored, access-controlled data. For example and without limitation, if the stored datum were a combination to a physical safe, the candidate datum would have to be in proper format for the combination dial. Any access-controlled datum having an expected format can be stored using this aspect of the present invention in which well-formedness is ensured during decryption by candidate access codes.

d. Combination Attacks

Figure 3:
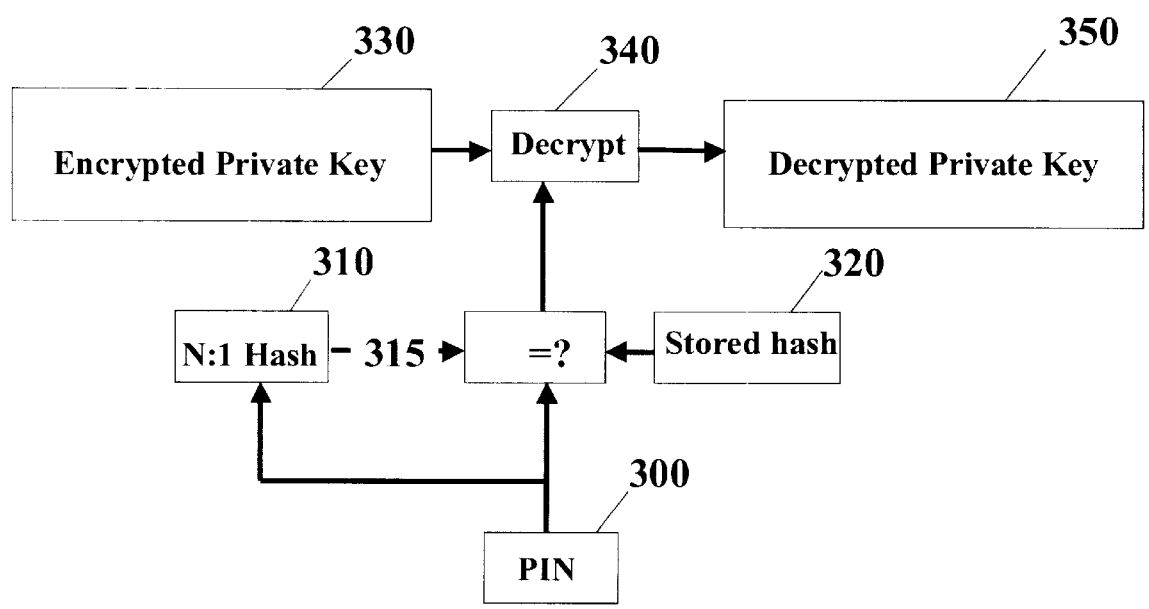
FIG. 3 illustrates an exemplary embodiment of a key wallet according to the present invention.
Figure 9:
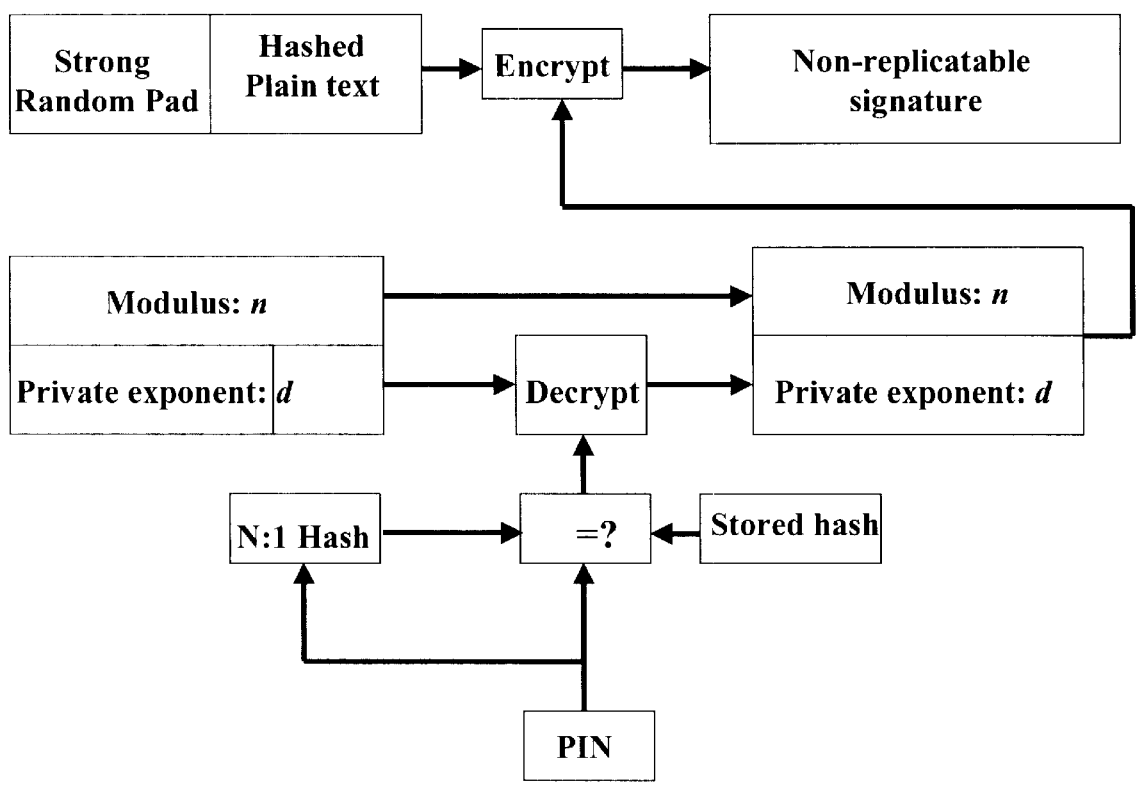
FIG. 9 illustrates an exemplary system for digitally signing a message, including a key wallet and associated key generation logic.

To simultaneously resist the PIN hash attack, the known signature attack and the ill-formed key attacks, the various aspects of the present invention as shown in FIG. 3, FIG. 7 and FIG. 8 can be combined as shown in the assembly of FIG. 9. Persons skilled in the art will recognize that any combination, subset or superset of the attacks can be resisted by combining (or modifying) the appropriate aspects of the present invention, for use in environments where that particular combination, subset or superset of the attacks is of concern.

2. Details of the Certification Component

The certification component of the present invention creates pubic key certificates that are somewhat different from the conventional public key certificates. Essentially, public keys as used herein are not truly public as with conventional methods, but are meant for limited distribution (e.g., within organizations, across intranets or otherwise within closed or pseudo-public enterprises). This deviation from conventional methods is used to resist the following attack on the private key.

a. Known Public Key Attack

Figure 10:
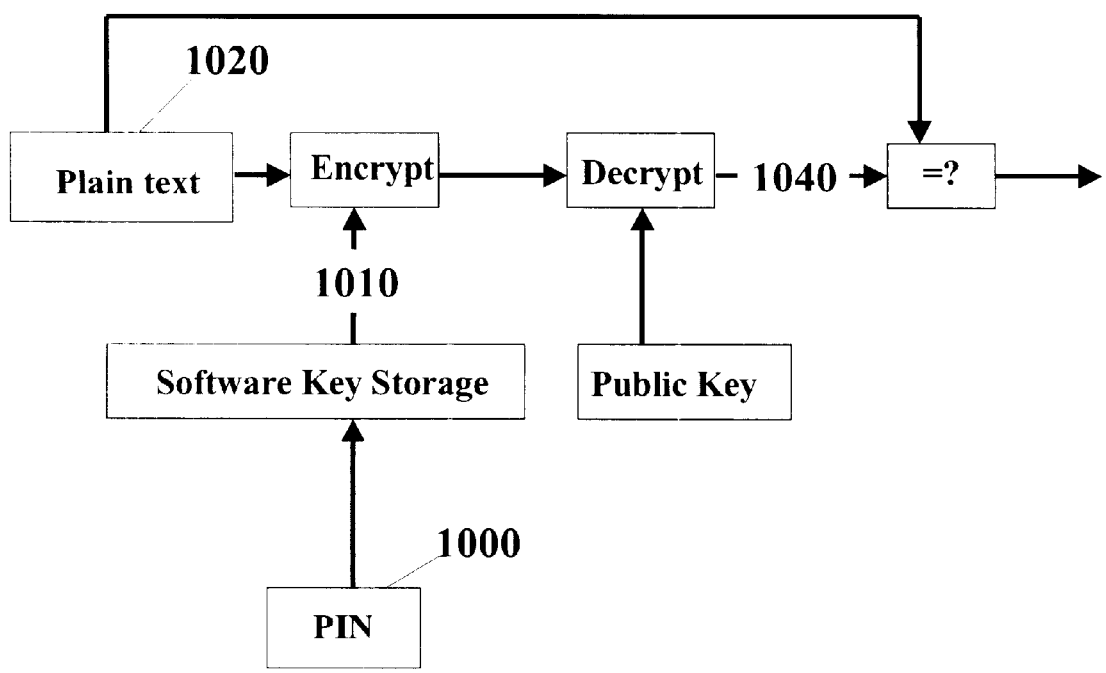
FIG. 10 illustrates a known public key attack that is addressed by a pseudo-public certificate aspect of the present invention.

In this attack, the malicious hacker has access to two pieces of information: (a) the user's key wallet, and (b) the user's public key, as might be readily available in a public key certificate directory. The attack is shown pictorially in FIG. 10. The hacker will try all possible PINs 1000 on the key wallet, and for each pseudo-valid PIN, he would use the decrypted private key 1010 to encrypt an arbitrarily chosen sample message 1020, and then decrypt the encrypted message with the user's public key. If the decrypted message 1040 matches the plain text sample message, the hacker knows that he has discovered the correct PIN and recovered the user's correctly decrypted private key.

To resist this attack, one embodiment of the present invention does not permit public keys to be truly public. As a matter of convenience, we shall call such limited-distribution public keys "pseudo-public keys" and we shall call certificates containing such pseudo-public keys "pseudo-public certificates." Specifically, pseudo-public certificates contain the user's pseudo-public key in encrypted form. Only authorized parties can access a pseudo-public key to verify the user's signature. This is in strong contrast with the conventional use of public key certificates, where anybody can verify a public key signature. Of course, the key wallet and other aspects or embodiments of the present invention could be used with conventional certificates alone, but even greater security is provided if pseudo-public keys and certification are also used, as described herein. Those skilled in the art will readily appreciate that existing certification issuance devices and procedures may readily be adapted to accommodate the foregoing embodiment of the present invention. Therefore, the specific hardware and/or software implementations of this embodiment of a certification component need not be described in detail. Rather, only the differences from the conventional certificates will be described below. Readers skilled in the art will recognize that conventional certificates come in several formats, most notable of which is the X.509 format and its revisions; however, the essential elements of all the conventional formats are similar, when viewed in relation to the present invention.

Figure 11:
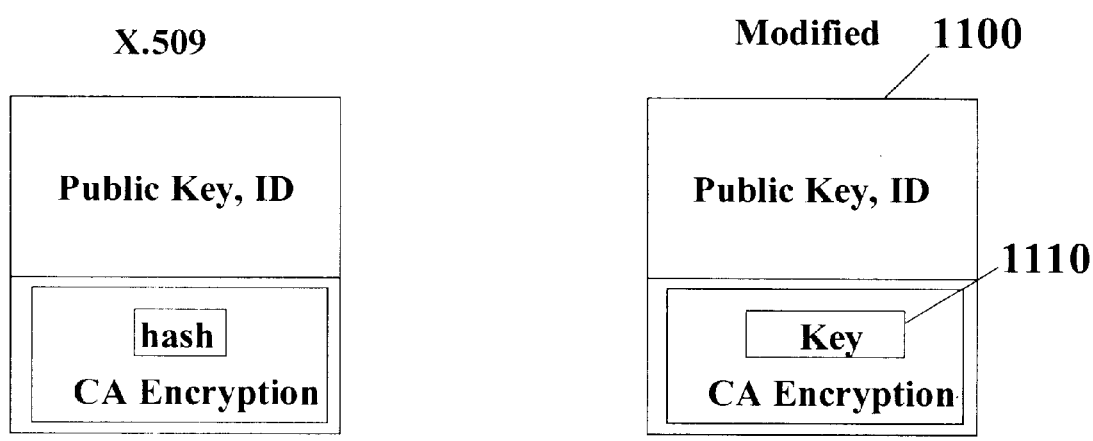
FIG. 11 illustrates a conventional and an exemplary pseudo-public certificate.

A conventional public key certificate and one possible embodiment of a pseudo-public certificate are shown side by side in FIG. 11. The exemplary pseudo-public certificate may have the same format as the conventional certificate. However, the body of the certificate 1100 containing the pseudo-public key is encrypted in a manner that is readable only by an authorized verifier. For example, in one implementation, the encryption could be by the public key of the authorized verifier. Only authentication servers that have access to the corresponding private key can unwrap the user's certificate to access the user's public key. If there are several authorized verifiers, the body of the certificate could carry several encrypted copies of the pseudo-public key, each copy being encrypted by the public key of one of the verifiers. Each enterprise or entity employing this aspect of the present invention would have a certificate server having the above-described certification components to support its pseudo-public certificates. Persons skilled in the art will appreciate that the important characteristic of the pseudo-public certificate is that the public key is encrypted and can be decrypted only by authorized verifiers, and this characteristic may be achieved in many different ways using a variety of cryptographic algorithms. For example, in an alternate embodiment of the pseudo-public key certificate, the public key would be encrypted by a DES key, and the DES key would be encrypted by the public key of the authorized verifier.

The resulting certificate would then be signed by the certifying authority similar to a conventional certificate. It is the pseudo-public nature of public keys in the present invention that provides for two significant advantages in key management. Firstly, since the certifying authority is explicitly aware of who is authorized to use the public-key certificates, the legal liability of the CA could, as a practical matter, be limited. This is in contrast to the conventional certificate where the CA has no prior knowledge of who will use the certificate. Secondly, revoking a public-key certificate is made easy, since the CA only has to notify those verifiers authorized to use the public-key certificates.

Figure 12:
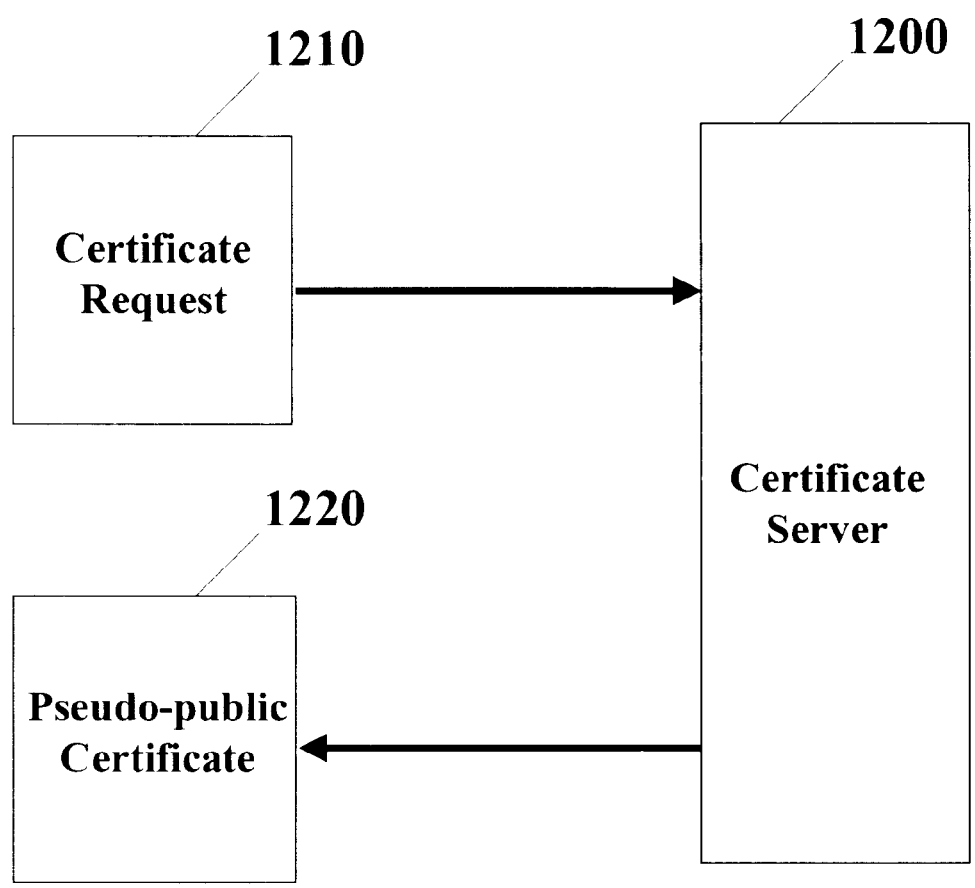
FIG. 12 illustrates an exemplary certificate server aspect of the present invention.

Certificates of the proposed form will be issued by the certification component, acting as a certificate server as shown in FIG. 12. As those skilled in the art will appreciate, the server will comprise a series of logic modules that can be implemented in software, hardware, or a combination thereof. The user who wishes to be certified will submit a digitally signed request for such as input 1210 to the certificate server 1200. Such a request would typically contain the user's public key that is to be certified, along with his name or other identifying attributes. The certificate server would verify the user's digital signature using the submitted public key. If the signature verifies correctly, the server would check the user's identity information in the database 1220, and then issue a public key certificate 1230 of the proposed form as output. Those skilled in the art will recognize that the user identity database could be supplanted by other sources of information to verify the identity of the user requesting the certificate.

An alternate realization of the pseudo-public certificate server could involve a modification unit to be attached to a conventional certificate server. Such an add-on unit could operate on the input or the output of the conventional certificate server. In the event the modification unit operates on the input, it would repackage the request for the certificate by encrypting the users public key, and embed the encrypted public key among the identification attributes. The modification unit would then attach a dummy public key to the request, sign the request with the associated private key and pass on the request to the conventional certificate server. The output of the conventional certificate server would be a certificate containing the encrypted public key of the user as one of the identifying attributes. In the event the modification unit operates on the output of a conventional certificate server, the unit would repackage the conventional certificate produced by the conventional certificate server by encrypting the public-key exponent in the certificate in situ, and then overwriting the signature of the certificate server with a fresh signature of the modified certificate. Persons skilled in the art will appreciate that other alternative embodiments are possible.

3. Details of the Key Generation Component

This component generates the public and private key of a user at set-up time, when the user creates his credentials. Public key creation (whether in the conventional sense or in the pseudo-public sense) in this aspect of the present invention is generally similar to conventional key generation techniques, but with a slight modification to resist the following attack.

a. Known Public Key Exponent Attack

This is an attack that is particular to the RSA cryptosystem, and is a variant of the known public key attack described above. In the RSA system, it is common to use public keys with simple, fixed exponents (e.g., 3 or 65537) to accelerate cryptographic operations. Unfortunately, this makes it possible for the malicious hacker to mount a known public key attack. The hacker will try all possible PINs on the key wallet, and for each pseudo-valid PIN, he would extract the decrypted private key and separate it into the private exponent and the modulus. Since a RSA public key consists of the known exponent and the same modulus, the hacker can combine the two to assemble a candidate public key. He would then mount the known public key attack described above. In order to resist this attack, the key generation aspect of the present invention can utilize public keys with long exponents, say 64–128 bits, that are generated randomly at key generation time.

4. Details of the Verification Component

The verification component of the present invention differs in two ways from the verification component in conventional systems. The verification component must respect the pseudo-public nature of the public key certificate, and take appropriate steps to extract a user's public key from the certificate before verifying the user's signature. In an exemplary embodiment of this aspect of the invention, these would include receiving a certificate containing an encrypted pseudo-public key of the certificate holder, and using the private key of an authorized verifier to decrypt the pseudo-public key. The verification component would then use the pseudo-public key to verify a digital signature in a message sent by the certificate holder. In an alternative embodiment, if a DES key had been used to encrypt the pseudo-public key, the DES key would first be decrypted using the private key of the verifier, and in turn the DES key used to decrypt the pseudo-public key. No matter what the decryption mechanism, the verification component should also include logic to detect break-in attempts by fraudulent hackers, e.g., those signing messages with incorrect candidate private keys corresponding to the pseudo-valid access codes of the key wallet aspect of the present invention. In such a case, a fraudulent hacker might steal or otherwise obtain the legitimate user's pseudo-public certificate and send the certificate along with a fraudulent message signed with the incorrect candidate private key. The inconsistency between the legitimate user's correct pseudo-public key in the certificate and the incorrect candidate private key allows detection of the fraudulent user. In particular, in one embodiment, if a particular user's signature is not verified in three successive attempts, the verification component concludes that a break-in might be in progress, and freezes the user's access privileges pending further investigation. In addition to (or instead of) freezing the access, the verification component might sound an alarm alerting an operator of the attempted break-in. There are other methods of detecting break-in attempts at the verification component, and other possible courses of action upon detecting a break-in. As those skilled in the art will appreciate, the verification component will compromise a series of logic modules that can be implemented in software, hardware, or a combination thereof.

5. Modifications, Enhancements and Alternate Embodiments

The foregoing has described various aspects of the present invention. Although in one preferred embodiment, the key wallet, the key generation component, the key verification component and the key certification component are all used together to provide a secure technology for cryptographic key storage and use, those skilled in the art will appreciate that in alternative embodiments, various subsets of the whole system may also be combined for particular applications not requiring all of the components.

In addition, although all of the foregoing has been described with respect to a software-based system, this is not strictly necessary. For example, some or all of the components could be deployed using microcode and PLAs or ROMs, general purpose programming language and general purpose microprocessors, or ASICs. That is, the invention is not limited to software per se, but could be deployed in virtually any form of logic, including pure software, a combination of software and hardware, or even hardware alone.

Furthermore, although various embodiments or aspects have been described with regard to RSA cryptography (for the public and/or pseudo-public keys and public and/or pseudo-public certificates) or DES cryptography (for the PIN encryption and storage of the pseudo-public key on the pseudo-public certificate), those skilled in the art will appreciate that many modifications and enhancements to such exemplary cryptographic technology are possible. More generally, each of the aforementioned operations can be implemented from a broad choice of cryptographic techniques, including many kinds of asymmetric or symmetric encryption as well as CRCs, hashes, message digests, or other one-way functions. For example, an asymmetric encryption operation could be replaced with a (optionally keyed) one-way function where integrity is the primary concern, or encryption of a symmetric session key followed by use of the session key for plaintext encryption, and various other alternatives that are well-known to those skilled in the art. Finally, although the exemplary embodiment has been described with respect to PINs protecting a private key, those skilled in the art will realize that the same technology of cryptographic camouflaging can be used with other types of access codes and cryptographic representations to protect any access-controlled datum. Therefore, it is intended that the scope of the invention be limited only by the claims appended below.

What is claimed is:

1. An apparatus for managing access to a cryptographically secured access-controlled datum, comprising:

(a) computer-implemented input logic means for receiving a candidate access code;

(b) a first computer memory configured to store a cryptographically camouflaged access-controlled datum;

(c) computer-implemented first cryptographic logic means operatively connected to said input logic means, and to said first computer memory, for processing said cryptographically camouflaged access-controlled datum using said candidate access code, said processing inhibiting the detection of cryptographic camouflaging by a fraudulent provider of said candidate access code by preserving a structural homogeneity corresponding to a pre-camouflaged state of said access-controlled datum; and (d) computer-implemented output logic means for providing said processed access-controlled datum to a user of said apparatus.

2. The apparatus of claim 1 wherein:
(a) said access-controlled datum has been at least partially encrypted using an access code;
(b) a second computer memory configured to store a cryptographic representation of said access code;
(c) said computer-implemented first cryptographic logic means includes:
  (i) computer-implemented second cryptographic logic means operatively connected to said computer-implemented input logic means and configured to regenerate said cryptographic representation of said access code in response to said candidate access code belonging to a plurality of pseudo-valid access codes; and
  (ii) computer-implemented third cryptographic logic means configured to receive said regenerated cryptographic representation from said computer-implemented second cryptographic logic means, and operatively connected to said first computer memory and to said computer-implemented input logic means for using said received candidate access code in decrypting said stored encrypted access-controlled datum to produce a decrypted access-controlled datum.

3. The apparatus of claim 2 wherein said access-controlled datum is a cryptographic key.

4. The apparatus of claim 3 wherein said cryptographic key is a private key.

5. The apparatus of claim 4 further comprising a pseudo-public key corresponding to said private key.

6. The apparatus of claim 5 further comprising a pseudo-public certificate containing said pseudo-public key.

7. The apparatus of claim 6 wherein said pseudo-public key is encrypted.

8. The apparatus of claim 7 wherein said pseudo-public key is encrypted with a public key having a corresponding private key that is not known except to authorized verifiers.

9. The apparatus of claim 4 wherein said private key is well-formed.

10. The apparatus of claim 9 wherein said private key includes a well-formed modulus, and an exponent smaller than said modulus.

11. The apparatus of claim 9 wherein said private key includes:
(a) a cleartext representation of said modulus; and
(b) a cryptographic representation of at least a part of an exponent corresponding to said modulus.

12. The apparatus of claim 11:
(a) further comprising a third computer memory for storing a number larger than said exponent and smaller than said modulus; and
(b) wherein said at least part of said exponent is stored in an expanded form which, when evaluated modulo said number, equals said at least part of said exponent.

13. The apparatus of claim 11 wherein said at least part of said exponent represents certain less significant bits of said exponent.

14. The apparatus of claim 3 wherein said second computer-implemented cryptographic logic means for said regeneration of said cryptographic representation of said access code includes a many-to-one hash.

15. The apparatus of claim 14 wherein said many-to-one hash is characterized in that said plurality of pseudo-valid access codes are scattered among a plurality of invalid access codes.

16. The apparatus of claim 2 wherein:
(a) said cryptographic representation includes a hash function; and
(b) said second computer-implemented cryptographic logic means for said regeneration of said cryptographic representation includes a many-to-one hash.

17. The apparatus of claim 16 wherein said access-controlled datum is a private key.

18. The apparatus of claim 17 wherein said private key is well-formed.

19. The apparatus of claim 17 further comprising digital signing logic means including:
(a) computer-implemented input logic means for receiving a message to be signed;
(b) randomizing logic means for generating random data; and
(c) computer-implemented fourth cryptographic logic means operatively connected to said computer-implemented input logic means and to said randomizing logic means for:
  (i) padding said received message with said generated random data; and
  (ii) signing said padded message with said decrypted access-controlled datum.

20. The apparatus of claim 17 further comprising a pseudo-public key corresponding to said private key.

21. The apparatus of claim 16 wherein said many-to-one hash is characterized in that said plurality of pseudo-valid access codes are scattered among a plurality of invalid access codes.

22. The apparatus of claim 1 wherein said stored access-controlled datum is a private key having a corresponding public key that includes an exponent of at least 64 bits.

23. The apparatus of claim 2 wherein said computer-implemented third cryptographic logic means is configured to disallow said decryption when said received candidate access code is an invalid access code.

24. The apparatus of claim 2 implemented as a software program interacting with a computer.

25. The apparatus of claim 2 implemented as a hardware device.

26. The apparatus of claim 2 further comprising digital signing logic means including:
(a) computer-implemented input logic means for receiving a message to be signed;
(b) randomizing logic means for providing random data; and
(c) computer-implemented fourth cryptographic logic means operatively connected to said input logic and to said randomizing logic means for:
  (i) padding said received message with said generated random data; and
  (ii) signing said padded message with said decrypted access-controlled datum.

27. The apparatus of claim 26 wherein said generated random data arises from a source outside of said apparatus.

28. The apparatus of claim 26 wherein said generated random data originates from a physical source.

29. The apparatus of claim 2 wherein said computer-implemented third cryptographic logic means for decrypting includes a symmetric cryptographic function.

30. The apparatus of claim 29 wherein said symmetric cryptographic function is DES.

31. A cryptographic key wallet comprising:
(a) computer-implemented input logic means for receiving a user-inputted access code that may belong to a plurality of pseudo-valid access codes;

(b) computer-implemented cryptographic logic means for inhibiting the detection of cryptographic camouflaging by a fraudulent inputter of one of said pseudo-valid access codes by:
  (i) cryptographically verifying said inputted pseudo-valid access code; and
  (ii) decrypting a cryptographically-camouflaged access-controlled datum using said inputted pseudo-valid access code to produce a decrypted access-controlled datum having a structural homogeneity corresponding to a pre-camouflaged state of said access-controlled datum; and
(c) computer-implemented output logic means for providing said decrypted access-controlled datum to said user.

32. The cryptographic key wallet of claim 31 wherein said access-controlled datum includes a private key having a corresponding pseudo-public key.

33. The cryptographic key wallet of claim 32 further comprising a pseudo-public certificate containing said pseudo-public key.

34. A digital certificate server comprising:
(a) computer-implemented input logic means for receiving from a requester a digitally signed request for a pseudo-public digital certificate, said request including:
  (i) a pseudo-public key to be certified, and
  (ii) an identifying attribute of said requestor;
(b) computer-implemented cryptographic logic means for verifying said digitally signed request using said pseudo-public key;
(c) computer-implemented logic means for creating said pseudo-public certificate upon said verifying said digitally signed request, said certificate including said pseudo-public key encrypted under a cryptographic key whose corresponding decryption key is available only to authorized verifiers; and
(d) computer-implemented output logic means for providing said pseudo-public certificate for said requestor.

35. The digital certificate server of claim 34 implemented as an add-on module for use with a conventional digital certificate server.

36. The digital certificate server of claim 34 configured for use with a digital wallet, said digital wallet comprising:
(a) computer-implemented input logic means for receiving a candidate access code;
(b) a first computer memory configured to store a cryptographically camouflaged access-controlled datum;
(c) computer-implemented first cryptographic logic means operatively connected to said computer-implemented input logic means and said first computer memory for processing said cryptographically camouflaged access-controlled datum using said candidate access code; and
(d) computer-implemented output logic means for providing said processed datum access-controlled datum to a user of said apparatus.

37. The digital certificate server of claim 34 wherein said pseudo-public certificate is of a modified conventional format.

38. The digital certificate server of claim 34 wherein said pseudo-public key is encrypted.

39. The digital certificate server of claim 38 wherein said pseudo-public key is encrypted with a public key having a corresponding private key that is not known except to authorized verifiers.

40. Apparatus for verifying a digitally-signed message, comprising:

(a) computer-implemented input logic means for receiving a digitally-signed message and a pseudo-public key allegedly corresponding to a signer of said message, said pseudo-public key encrypted under a cryptographic key whose corresponding decryption key is available only to authorized verifiers;
(b) computer-implemented cryptographic logic means for using a decryption key of at least one of said authorized verifiers to cryptographically recover the pseudo-public key; and
(c) computer-implemented signalling logic means for detecting fraudulent use of said message upon failure of said verified pseudo-public key to successfully verify said signed message.

41. The apparatus of claim 40 wherein said received pseudo-public key is contained in a pseudo-public certificate.

42. The apparatus of claim 40 wherein said digitally-signed message is signed using a candidate private key that was generated by a cryptographic key wallet in response to a pseudo-valid access code.

43. The apparatus of claim 42 wherein said key wallet includes:
(a) computer-implemented input logic means for receiving a candidate access code;
(b) a first computer memory configured to store a cryptographically camouflaged access-controlled datum;
(c) computer-implemented first cryptographic logic means operatively connected to said computer-implemented input logic means and said first computer memory for processing said cryptographically camouflaged access-controlled datum using said candidate access code; and
(d) computer-implemented output logic means for providing said processed datum access-controlled datum to a user of said apparatus.

44. The apparatus of claim 40 wherein said logic for detecting said fraudulent use includes computer-implemented logic means for freezing access to said apparatus upon a plurality of unsuccessful attempted verifications.

45. The apparatus of claim 40 wherein said logic means for detecting said fraudulent use includes computer-implemented logic means for effecting an alarm upon unsuccessful attempted verification.

46. The apparatus of claim 40 wherein said decryption key is a private key of a private-public key pair of at least one of said authorized verifiers.

47. A method for providing a stored cryptographically-secured access-controlled datum, comprising the steps of:
(a) receiving a candidate access code from a user of a digital wallet;
(b) accessing a stored, cryptographically camouflaged access-controlled datum;
(c) cryptographically processing said cryptographically camouflaged access-controlled datum using said candidate access code, said processing inhibiting the detection of cryptographic camouflaging by a fraudulent provider of said candidate access code by preserving a structural homogeneity corresponding to a pre-camouflaged state of said access-controlled datum; and
(d) providing said processed access-controlled datum to said user of said wallet.

48. The method of claim 47 wherein said step of cryptographically processing said cryptographically camouflaged access-controlled datum using said candidate access code includes:

(a) accessing from a first memory within a digital wallet, an access-controlled datum that has been at least partially encrypted using an access code;

(b) accessing from a second memory within said digital wallet, a cryptographic representation of said access code;

(c) regenerating said cryptographic representation of said access code in response to said candidate access code belonging to a plurality of pseudo-valid access codes; and (d) using said received candidate access code, decrypting said encrypted access-controlled datum to produce a decrypted access-controlled datum.

49. The method of claim 48 wherein said access-controlled datum is a cryptographic key.

50. The method of claim 49 wherein said stored access-controlled datum is a private key having a corresponding public key that includes a long exponent.

51. The method of claim 49 wherein said cryptographic key is a private key.

52. The method of claim 51 wherein said private key is a member of a cryptographic key pair including a pseudo-public key corresponding to said private key.

53. The method of claim 52 wherein said digital wallet includes a pseudo-public certificate containing said pseudo-public key.

54. The method of claim 53 wherein said pseudo-public key is encrypted.

55. The method of claim 54 wherein said pseudo-public key is encrypted with a public key having a corresponding private key that is not known except to authorized verifiers.

56. The method of claim 52 wherein said private key is well-formed.

57. The method of claim 56 wherein said private key includes a well-formed modulus, and an exponent smaller than said modulus.

58. The method of claim 56 wherein said private key includes:

(a) a cleartext representation of said modulus; and (b) a cryptographic representation of at least a part of an exponent corresponding to said modulus.

59. The method of claim 58 wherein:

(a) said private key is stored in said first memory as an expanded form of at least part of said exponent; and (b) said step of decrypting said encrypted access-controlled datum includes:
   (i) retrieving from a third memory a number larger than said exponent and smaller than said modulus;
   (ii) retrieving said expanded form of at least part of said exponent from said first memory; and
   (iii) evaluating said expanded form of at least part of said exponent, modulo said number, to recover said at least part of said exponent.

60. The method of claim 58 wherein said at least part of said exponent represents certain less significant bits of said exponent.

61. The method of claim 51 wherein said step of regenerating said cryptographic representation of said access code includes performing a many-to-one hash.

62. The method of claim 61 wherein said many-to-one hash is characterized in that said plurality of pseudo-valid access codes are scattered among a plurality of invalid access codes.

63. The method of claim 49 wherein:

(a) said cryptographic representation includes a hash function; and (b) said step of regenerating said cryptographic representation of said access code includes performing a many-to-one hash.

64. The method of claim 63 wherein said many-to-one hash is characterized in that said plurality of pseudo-valid access codes are scattered among a plurality of invalid access codes.

65. The method of claim 63 wherein said access-controlled datum is a private key.

66. The method of claim 65 further comprising the steps of:

(a) receiving a message to be signed;

(b) generating random data;

(c) padding said received message with said generated random data; and (d) signing said padded message with said decrypted access-controlled datum.

67. The method of claim 65 wherein said private key is a member of a cryptographic key pair including a pseudo-public key corresponding to said private key.

68. The method of claim 65 wherein said private key is well-formed.

69. The method of claim 49 implemented via a hardware device.

70. The method of claim 49 wherein said step of decrypting said access-controlled datum is disallowed when said received candidate access code is an invalid access code.

71. The method of claim 49 implemented as a software program.

72. The method of claim 49 further comprising the steps of:

(a) receiving a message to be signed;

(b) generating random data;

(c) padding said received message with said generated random data; and (d) signing said padded message with said decrypted access-controlled datum.

73. The method of claim 72 wherein said generated random data arises from a source outside of said apparatus.

74. The method of claim 72 wherein said generated random data originates from a physical source.

75. The method of claim 49 wherein said step of decrypting said encrypted access-controlled datum includes performing a symmetric cryptographic operation thereon.

76. The method of claim 75 wherein said symmetric cryptographic operation is DES.

77. A method for providing a stored cryptographically-secured access-controlled datum, comprising the steps of:

(a) receiving, at a digital wallet, a user-inputted access code that may belong to a plurality of pseudo-valid access codes;

(b) inhibiting the detection of cryptographic camouflaging by a fraudulent inputter of one of said pseudo-valid access codes by:
   (i) cryptographically verifying said inputted pseudo-valid access code; and
   (ii) decrypting a cryptographically-camouflaged access-controlled datum using said inputted pseudo-valid access code to produce a decrypted access-controlled datum having a structural homogeneity corresponding to a pre-camouflaged state of said access-controlled datum; and (c) providing said decrypted access-controlled datum to said user of said digital wallet.

78. The method of claim 77 wherein said access-controlled datum includes a private key having a corresponding pseudo-public key.

79. The method of claim 78 wherein said digital wallet includes a pseudo-public certificate containing said pseudo-public key.

80. A method for generating a pseudo-public digital certificate comprising the steps of:
 (a) receiving from a requestor a digitally signed request for a pseudo-public digital certificate, said request including:
  (i) a pseudo-public key to be certified, and
  (ii) an identifying attribute of said requestor;
 (b) cryptographically verifying said digitally signed request using said pseudo-public key;
 (c) creating said pseudo-public certificate upon said verifying said digitally signed request, said certificate including said pseudo-public key encrypted under a cryptographic key whose corresponding decryption key is available only to authorized verifiers; and
 (d) outputting said pseudo-public certificate for said requestor.

81. The method of claim 80 further comprising the step of placing said created digital certificate in a digital wallet, said digital wallet comprising:
 (a) computer-implemented input logic means for receiving a candidate access code;
 (b) a first computer memory configured to store a cryptographically camouflaged access-controlled datum;
 (c) computer-implemented first cryptographic logic means operatively connected to said input logic means and said first computer memory for processing said cryptographically camouflaged access-controlled datum using said candidate access code; and
 (d) computer-implemented output logic means for providing said processed access-controlled datum to a user of said apparatus.

82. The method of claim 80 wherein said pseudo-public certificate is of a modified conventional format.

83. The apparatus of claim 82 wherein said pseudo-public key is encrypted.

84. The method of claim 83 wherein:
 (a) said pseudo-public key is encrypted with a public key having a corresponding private key that is not known except to authorized verifiers.

85. The method of claim 80 performed via an add-on module for use with a conventional digital certificate server.

86. A method for verifying a digitally-signed message, comprising the steps of:
 (a) receiving, at a message verification apparatus, a digitally-signed message and a pseudo-public key allegedly corresponding to a signer of said message, said pseudo-public key encrypted under a cryptographic key whose corresponding decryption key is available only to authorized verifiers;
 (b) using a decryption key of at least one of said authorized verifiers to cryptographically recover the pseudo-public key; and
 (c) detecting fraudulent use of said message upon failure of said verified pseudo-public key to successfully verify said signed message.

87. The method of claim 86 wherein said decryption key is a private key of a private-public key pair of at least one of said authorized verifiers.

88. The apparatus of claim 86 wherein said received pseudo-public key is contained in a pseudo-public certificate.

89. The method of claim 86 wherein said digitally-signed message is signed using a candidate private key that was generated by a cryptographic key wallet in response to a pseudo-valid access code.

90. The method of claim 89 wherein said key wallet includes:
 (a) computer-implemented input logic means for receiving a candidate access code;
 (b) a first computer memory configured to store a cryptographically camouflaged access-controlled datum;
 (c) computer-implemented first cryptographic logic means operatively connected to said input logic means and said first computer memory for processing said cryptographically camouflaged access-controlled datum using said candidate access code; and
 (d) computer-implemented output logic means for providing said processed access-controlled datum to a user of said apparatus.

91. The method of claim 86 wherein said step of detecting said fraudulent use includes freezing access to said message verification apparatus upon a plurality of unsuccessful attempted verifications.

92. The method of claim 86 wherein said step of detecting said fraudulent use includes effecting an alarm upon unsuccessful attempted verification.

93. A method for storing a stored cryptographically-secured access-controlled datum, comprising the steps of:
 (a) receiving an access-controlled datum;
 (b) cryptographically camouflaging said access-controlled datum such to be recognizable by an authorized user thereof but unrecognizable to an unauthorized user thereof by preserving a structural homogeneity corresponding to a pre-camouflaged state of said access-controlled datum; and
 (c) storing said camouflaged access-controlled datum in a digital wallet.

94. The method of claim 93 wherein said step of cryptographically camouflaging said access-controlled datum includes:
 (a) receiving an access code;
 (b) computing a cryptographic representation of said access code, said representation having the property of being reproducible in response to a plurality of pseudo-valid access codes;
 (c) storing said computed cryptographic representation of said access code;
 (d) at least partially encrypting said access-controlled datum using said access code;
 (e) storing said at least partially encrypted access-controlled datum for subsequent access by a user providing one of said plurality of said pseudo-valid access codes.

95. The method of claim 94 wherein said access-controlled datum is a cryptographic key.

* * * * *